United States Patent
Lorenz et al.

(10) Patent No.: US 8,934,853 B2
(45) Date of Patent: Jan. 13, 2015

(54) SYSTEMS AND METHODS FOR INTEGRATING CELLULAR AND LOCATION DETECTION FUNCTIONALITY USING A SINGLE CRYSTAL OSCILLATOR

(75) Inventors: Robert Lorenz, Menlo Park, CA (US); Kamesh Medapalli, San Jose, CA (US); Frank Van Diggelen, San Jose, CA (US); Charlie Abraham, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 255 days.

(21) Appl. No.: 13/492,311

(22) Filed: Jun. 8, 2012

(65) Prior Publication Data
US 2013/0149974 A1      Jun. 13, 2013

Related U.S. Application Data

(60) Provisional application No. 61/494,841, filed on Jun. 8, 2011.

(51) Int. Cl.
*H04W 4/02* (2009.01)
*H04B 1/38* (2006.01)
*H04B 1/40* (2006.01)

(52) U.S. Cl.
CPC ............... *H04W 4/02* (2013.01); *H04B 1/3805* (2013.01); *H04B 1/406* (2013.01)
USPC .......... 455/75; 455/180.3; 455/141; 455/146; 455/147; 455/148; 342/357.12

(58) Field of Classification Search
CPC ............... H04B 1/406; H04B 2215/00; H04B 2215/064; H04B 2215/065; H04B 15/00; H04B 15/06; H04B 15/04; H04W 4/02
USPC ........... 455/517, 75, 192.2, 257, 553, 84, 86, 455/427, 12.1, 552, 93, 142, 81, 77, 313, 455/323, 164.1, 164.2, 173.1, 180.3; 342/357.12; 331/158, 154, 116 M, 175, 331/176; 375/229, 346, 267, 136, 146, 344, 375/341; 370/342, 503
See application file for complete search history.

(56) References Cited

U.S. PATENT DOCUMENTS 5,444,495 A *  8/1995  Takahama et al. ............. 348/458
6,195,563 B1 *  2/2001  Samuels ......................... 455/84
(Continued)

OTHER PUBLICATIONS

International Search Report for International Application No. PCT/US 12/41528, Commissioner for Patents, United States, mailed on Sep. 4, 2012.

(Continued)

*Primary Examiner* — Tan Trinh
(74) *Attorney, Agent, or Firm* — Sterne, Kessler, Goldstein & Fox PLLC (57) ABSTRACT

Embodiments of the present disclosure use shared oscillator for cellular communications and location detection in a communication device. The communications device estimates a frequency offset of one of its subsystems. The communications device determines a frequency offset that results from drifting of this shared oscillator, typically caused by aging and/or changes in temperature, voltage, humidity, pressure, and/or vibration to provide some examples, from the frequency offset this subsystem. The communications device provides various compensation parameters to its various subsystems to compensate for the frequency offset that results from drifting of the oscillator.

23 Claims, 6 Drawing Sheets

(56) References Cited

U.S. PATENT DOCUMENTS

| | | |
|---|---|---|
| 7,424,069 B1 | 9/2008 | Nicholls et al. |
| 7,755,441 B1 * | 7/2010 | Cioffi et al. .................. 331/154 |
| 8,699,612 B1 * | 4/2014 | Chiu ............................. 375/267 |
| 2001/0044280 A1 * | 11/2001 | Samuels ........................ 455/77 |
| 2002/0081989 A1 * | 6/2002 | Boloorian .................... 455/313 |
| 2003/0193922 A1 * | 10/2003 | Ho et al. ...................... 370/342 |
| 2004/0063411 A1 * | 4/2004 | Goldberg et al. .......... 455/192.2 |
| 2006/0197620 A1 * | 9/2006 | Lee .............................. 331/158 |
| 2008/0198070 A1 * | 8/2008 | Wang et al. ............. 342/357.12 |
| 2010/0128824 A1 * | 5/2010 | Hui .............................. 375/344 |
| 2011/0159819 A1 * | 6/2011 | Yanni ......................... 455/67.11 |
| 2012/0207251 A1 * | 8/2012 | Hui .............................. 375/341 |
| 2013/0114661 A1 * | 5/2013 | Chiang et al. ................ 375/229 |
| 2014/0010337 A1 * | 1/2014 | Staszewski et al. .......... 375/376 |

OTHER PUBLICATIONS

International Preliminary Report on Patentability and Written Opinion of the International Searching Authority directed to related International Patent Application No. PCT/US2012/041528, mailed Apr. 1, 2014; 5 pages.

* cited by examiner

SYSTEMS AND METHODS FOR INTEGRATING CELLULAR AND LOCATION DETECTION FUNCTIONALITY USING A SINGLE CRYSTAL OSCILLATOR

CROSS REFERENCE TO RELATED APPLICATIONS

This application claims the benefit of U.S. Provisional Patent Application No. 61/494,841, filed on Jun. 8, 2011, which is incorporated by reference herein in its entirety.

FIELD OF THE INVENTION

This invention relates to signal processing and more specifically to frequency offset cancellation.

BACKGROUND OF THE INVENTION

Many mobile devices include both cellular communications functionality (e.g., according to the Long Term Evolution ["LTE"] standard) and location detection functionality (e.g., using Global Positioning System ["GPS"] or Global Navigation Satellite System ["GNSS"] technology). Traditional mobile devices utilize separate and discrete integrated circuits ("ICs") to implement the cellular communications functionality and the location detection functionality. Each of these separate and discrete IC traditionally has used its own dedicated crystal oscillator ("XO") for generation of a reference signal that is used for signal processing.

Cellular communications systems and GPS/GNSS systems have differing performance requirements for their respective XOs which typically precludes using a single, shared XO for both of these systems. For example, many GPS/GNSS systems use a temperature-compensated crystal oscillator ("TCXO") to increase frequency stability over temperature. Whereas, many cellular communications systems have strict phase noise requirements that may be difficult to meet a TCXOs. The competing requirements are discussed further below.

GPS/GNSS systems perform long coherent integrations to increase sensitivity and to improve the signal to noise ratio ("SNR") of signal measurements. To properly perform these long coherent integrations, a typical GPS signal (e.g., at 1575 MHz) should ideally remain coherent over a typical integration period of a high sensitivity receiver (e.g., fifty milliseconds to a few hundred milliseconds). To maintain high sensitivity, a frequency drift should ideally accumulate to a small fraction of a cycle within these timeframes. Without temperature-compensation, a crystal is generally not able to support the high level of sensitivity required for GPS/GNSS systems, especially in cases where thermal dynamics have a significant impact on sensitivity.

Many cellular communications systems have strict phase noise requirements that require a very high reference frequency that often requires the use of a frequency doubler with the XO. More specifically, there is a limit to the oscillation frequency that can be generated with a fundamental mode crystal, where the frequency limit is approximately 50 MHz. Therefore, a frequency multiplier, such as a doubler to provide an example, is necessarily applied to the output of an "ordinary" XO for use by the cellular communications systems to improve the phase noise. However, the output of a TCXO may be clipped, and/or include small DC offsets that can cause a duty cycle variation in its output, both of which preclude the use of the frequency multiplier in conjunction with the TCXO in cellular communications systems.

Thus, conventional implementations for mobile devices with both cellular communications and location detection functionality use separate crystal oscillators to meet the divergent needs for cellular communications and location detection. This dual-XO implementation strategy has drawbacks, however. For example, using two XOs is more expensive than using a single, shared XO due to the cost of the additional XO and the cost of additional supporting circuitry. Further, the oscillations of any one XO can introduce unwanted interference into circuitry supported by the other XO. Negating the impact of this interference can also require additional circuitry, which can also add to cost and semiconductor real estate. Finally, the use of two XOs complicates the sharing of precise knowledge of time and frequency between the GPS/GNSS and cellular systems.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

Embodiments of the present disclosure provide solutions for the above described problems caused by dual-XO implementations in mobile communication devices that both cellular communications and location detection functionality. By addressing the implementation-specific XO needs for cellular and location detection technology with a single shared XO, embodiments of the present disclosure provide low-cost, high-performance systems and methods for integrating cellular communications and location detection technology.

Embodiments of the present disclosure provide a system that includes a cellular communications subsystem and a location detection subsystem. The cellular communications subsystem and the location detection subsystem each operate using a single shared XO. Typically, the single shared XO meets phase noise requirements for cellular communications. However, the single shared XO may not support the high level of sensitivity required by the location detection subsystem. To do so, the system compensates for a frequency offset that results from drifting of the XO, typically caused by aging, and/or changes in temperature, voltage, humidity, pressure, and/or vibration to provide some examples. Specifically, the cellular system measures a frequency offset of the cellular communications subsystem, namely a difference between an actual frequency of the cellular communications subsystem and its expected or theoretical frequency. The cellular communications system can measure the frequency offset of a received signal by measuring the difference in the phase between symbols of the received signal and dividing this difference by a difference in time between the symbols. The system then estimates a frequency offset of the XO that results from its drifting, namely a difference between an actual frequency of the XO and its expected or theoretical frequency, and uses this estimate to compensate for the drifting of the XO within cellular communications subsystem and the location detection subsystem.

By applying the estimated frequency offset at a frequent interval, the uncorrected frequency offset and drift are significantly reduced and stability requirements of the location detection subsystem are met, and any potential issues in frequency stability experienced by the location detection subsystem are overcome. Embodiments of the present disclosure advantageously meet these frequency stability requirements using an XO that is shared with the cellular communications subsystem. Further, because these frequency stability requirements of the location detection subsystem are met without requiring a more expensive TCXO, embodiments of the present disclosure advantageously result in additional cost savings by allowing the use of an inexpensive XO to support the location detection functionality.

2. Systems

Exemplary Communication System

Figure 1A:
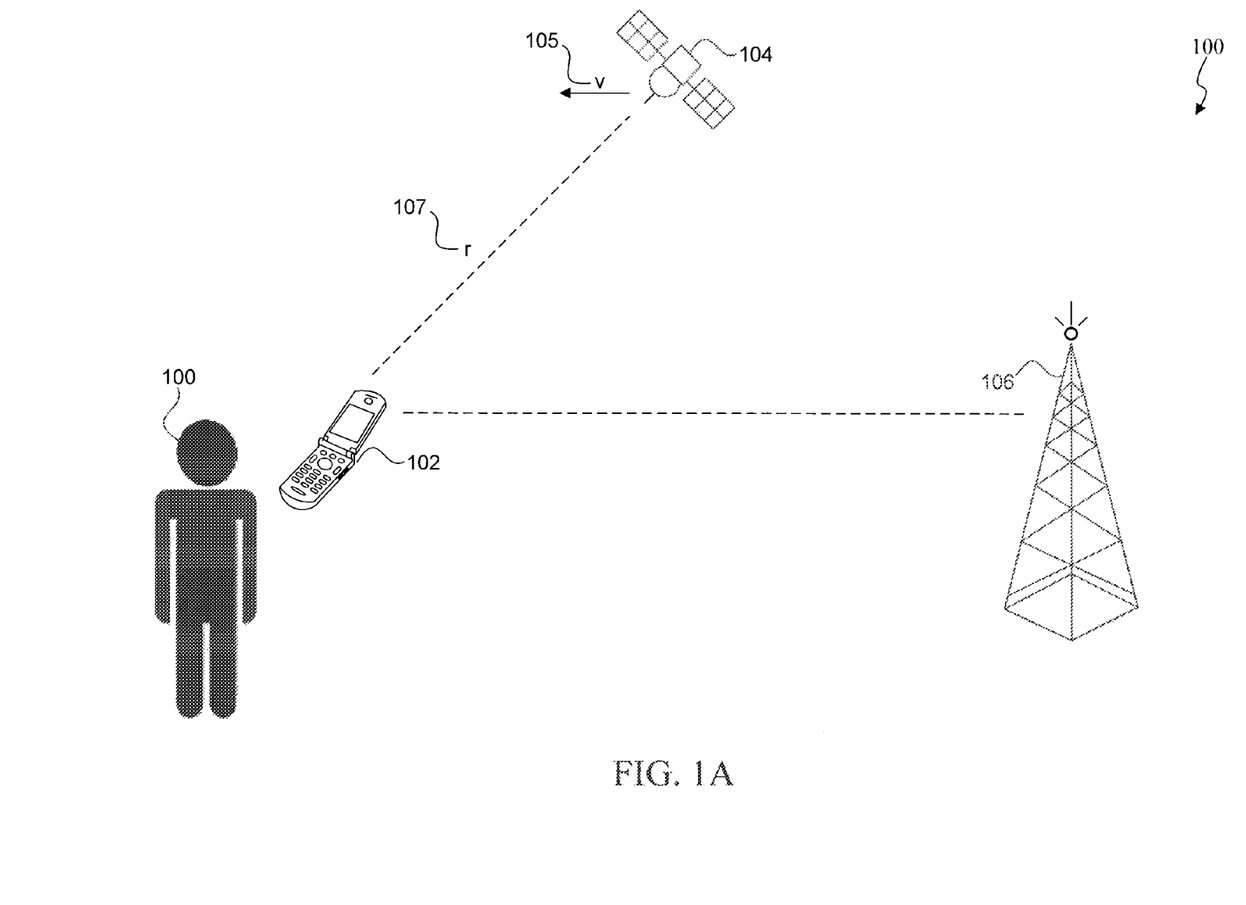
FIG. 1A is a diagram illustrating an exemplary communication system according to embodiments of the present disclosure.

FIG. 1A is a diagram illustrating an exemplary communication system according to embodiments of the present disclosure. In FIG. 1A, a user 100 holds a device 102 (e.g., a communications device, such as a mobile phone or portable computing device) that supports cellular communications functionality and location detection functionality with a single crystal oscillator ("XO"). Device 102 receives satellite signals from a satellite 104 to provide location detection services, such as GPS or GNSS, and also communicates with a cellular base station, shown as a cellular base station 106, to provide cellular communications from a cellular service provider. Satellite 104 has a velocity $\vec{v}$ 105 as it orbits around the Earth and distance to device 102 represented by radius r 107. While FIG. 1A illustrates device 102 as a communications device, it should be understood that embodiments of the present disclosure can be implemented on any device having a cellular subsystem and a location detection subsystem supported by a single, shared XO. Additionally, while FIG. 1A shows a single cellular base station 106 and a single satellite 104, it should be understood that device 102 can communicate with any number of mobile phone towers and/or satellites.

The single, shared XO represents any suitable free running oscillator that drifts in frequency over time, typically as a result of aging, and/or changes in temperature, voltage, humidity, pressure, and/or vibration to provide some examples. The device 102 estimates frequency offsets that are caused by this drifting of the single, shared XO and compensates for these frequency offsets to allow the device 102 to provide the location detection services and the cellular communications.

Exemplary Communication Device that can be Used in the Communication System

Figure 1B:
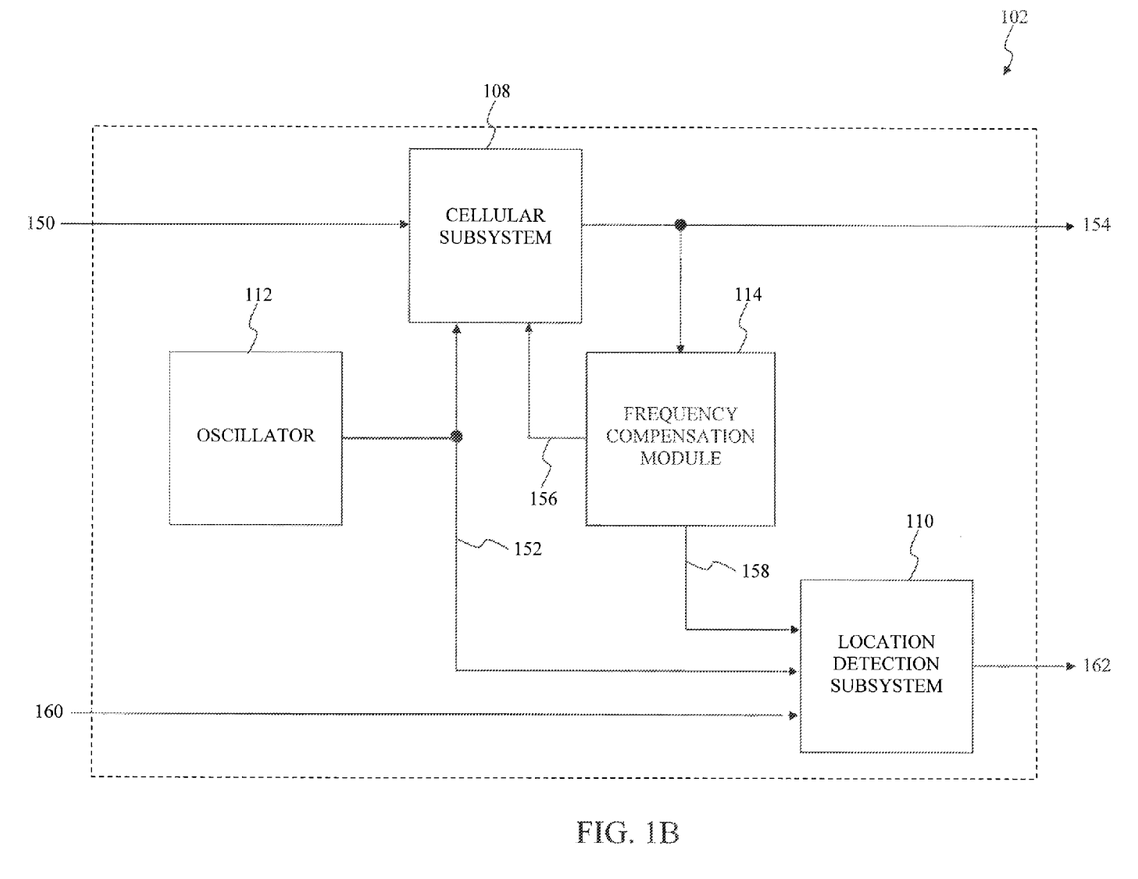
FIG. 1B is a block diagram illustrating a communications device that may be used within the exemplary system in accordance with embodiments of the present disclosure.

FIG. 1B is a block diagram illustrating a communications device that may be used within the exemplary system in accordance with embodiments of the present disclosure. A device 102 includes a cellular subsystem 108 for providing the cellular communications functionality and a location detection subsystem 110 for providing the location detection functionality. The cellular subsystem 108 and the location detection subsystem 110 each share a common, free-running, oscillator ("XO") 112 that can be characterized as providing a signal that is subject to drifting in frequency over time. For example, let $f_0$ denote the nominal frequency of the XO and let $f_{XO}(t)$ denote its actual frequency at time t. Then, $f_{XO}(t) = f_0(1+\epsilon(t))$, where $\epsilon(t)$ is the frequency offset.

The device 102 includes a frequency compensation module 114 to estimate frequency offset $\epsilon(t)$ within the cellular subsystem 108 that is caused by the drifting of this reference signal. The frequency compensation module 114 provides various compensation parameters to the cellular subsystem 108 and the location detection-subsystem 110 based upon a frequency offset $\epsilon$ to compensate for the drifting of the XO 112.

The cellular subsystem 108 receives a cellular communications signal 150 from a cellular base station, such as the cellular base station 106 to provide an example, and processes the cellular communications signal 150 using a reference signal 152 to provide a cellular data stream 154. Similarly, the location detection subsystem 110 receives a satellite communications signal 160 from a satellite, such as the satellite 104 to provide an example, and processes the satellite communications signal 160 using the reference signal 152 to provide a location data stream 162. Typically, the cellular subsystem 108 and the location detection subsystem 110 frequency translate a frequency of the reference signal 152 in accordance with a compensation parameter 156 before frequency translating the cellular communications signal 150 from a cellular band of communication to baseband, or near baseband and a compensation parameter 158 before frequency translating the satellite communications signal 160 from a satellite band of communication to baseband, or near baseband, respectively.

The XO 112 represents any suitable electrical, mechanical, or electro-mechanical device that provides the reference signal 152 that can be characterized being subject to drifting in frequency over time. The XO 112 can be characterized as being free-running which is responsive to environmental changes within the device 102, such as aging, and/or changes in temperature, voltage, humidity, pressure, and/or vibration to provide some examples. These environmental changes cause the frequency of the reference signal 152 to drift over time. As a result of this drifting, an actual frequency value of the reference signal 152 will differ from its expected or theoretical frequency value. This difference between the actual frequency value and the theoretical frequency value can cause difficulty in processing of the cellular communications signal 150 by the cellular subsystem 108 and/or processing of the satellite communications signal 160 by the location detection subsystem 110. In some embodiments, the XO 112 does not include any electrical, mechanical, and/or electro-mechanical circuitry for adjusting the reference signal 152. In other embodiments, the XO 112 can be implemented using a digitally compensated crystal oscillator.

The frequency compensation module 114 estimates the frequency offset ϵ(t), the difference between the actual frequency value and the theoretical frequency value of the XO 112 to provide an frequency offset estimate $\hat{\epsilon}$, and provides the compensation parameter 156 and the compensation parameter 158 to the cellular subsystem 108 and the location detection subsystem 110, respectively, based upon the frequency offset estimate $\hat{\epsilon}$. Specifically, one or more symbols S(0) through S(i) of the cellular data stream 154 includes one or more pilot symbols. The frequency compensation module 114 determines a ratio of an angle of a phase offset, which is a complex value, between two or more symbols within the cellular data stream 154 having pilot symbols and a time between these two or more symbols to estimate a cellular subsystem frequency offset ϵ. For example, to estimate a phase difference Δθ between a first symbol, denoted S(k), having at least one pilot symbol, and a later arriving, second symbol S(l), having at least one pilot symbol, the frequency compensation module 114 determines:

$$\Delta\theta = \text{angle}([S(k)C(k)]^T[S(l)C(l)]) \quad (1)$$

where C(k) represents a modulating code of a first cell that corresponds to the symbol S(k), C(l) represents a modulating code of a second cell, which can be the same as the cell, that corresponds to the symbol S(l), and the operator angle( ) represents an angle of the quantity $[S(k)C(k)]^T[S(l)C(l)]$ which is a complex number. Afterwards, the frequency compensation module 114, can estimate the frequency offset estimate $\hat{\epsilon}$ by determining a ratio of the phase difference Δθ and a time between the first and the second symbols, namely:

$$\hat{f} = \frac{\Delta\theta}{\Delta t} \quad (2)$$

where Δt represents a duration in time between symbols S(k) and S(l), namely a product of a symbol period of the symbols S(0) through S(i) and a number of other symbols between the first symbol and the second symbol. Next, the frequency compensation module 114 normalizes the cellular subsystem frequency offset ϵ to provide the frequency offset estimate $\hat{\epsilon}$ by evaluating:

$$\hat{\epsilon} = \frac{\hat{f}}{f_{cell}}, \quad (3)$$

where $f_{cell}$ represents an operational frequency of the cellular subsystem 108.

In some situations, the cellular subsystem 108 and the location detection subsystem 110 each include frequency synthesizers that are implemented using one or more phase locked loops (PLLs). The one or more PLLs of the frequency synthesizer of the cellular subsystem 108 frequency translate the reference signal 152 by a fractional ratio $N_{cell}$, sometimes referred to as a cellular divide ratio, denoted as:

$$N_{cell} = \frac{f_{cell}}{f_O(1+\hat{\epsilon})}, \quad (4)$$

where $f_O$ represents the theoretical frequency value of the XO 112, namely a frequency of the reference signal 152 absent any drifting of the XO 112. This fractional ratio $N_{cell}$ can be calculated by the frequency compensation module 114 and provided to the cellular subsystem 108 by the frequency compensation module 114 via the compensation parameter 156.

Likewise, the one or more PLLs of the frequency synthesizer of the frequency compensation module 114 frequency translate the reference signal 152 by a fractional ratio $N_{LOC}$. Additionally, this fractional ratio $N_{LOC}$ can also be used to compensate for any Doppler effect caused by the motion of satellite 104. For example, the estimated frequency of a satellite k can be given by the equation:

$$f_{LOC,k} = f_{LOC}(1+\Delta k), \quad (5)$$

where $f_{LOC}$ represents a standard operational frequency for satellite positioning, typically approximately 1575.42 MHz, Δk represents the Doppler effect or Doppler shift relating to the projection of the velocity $\vec{v}$ 105 of the $k_{th}$ satellite (e.g., satellite 104) onto a vector from the $k_{th}$ satellite to the user (e.g., user 100). The Doppler effect Δk can be approximated as:

$$\Delta k \approx \frac{\langle \vec{v}, r \rangle f_{SATE,center}}{|r|c}, \quad (6)$$

where $f_{SATE,center}$ represents the center frequency of satellite 104, c represents the speed of light (about $3 \times 10^8$ m/s), $\vec{v}$ represents the velocity 105 of satellite 104, and r represents the radius 107 from satellite 104 to device 102. In an embodiment, the quantities $\vec{v}$ 105 and r 107 are known parameters from satellite orbit parameters transmitted to device 102. Thus, Δk and $f_{LOC,k}$ can be calculated, based on these known parameters, by the frequency compensation module 114. Accordingly a fractional ratio $N_{LOC}$, sometimes referred to as a location divide ratio, can by determined by:

$$N_{LOC} = \frac{f_{LOC,k}}{f_{XO}(1+\hat{\epsilon})}. \quad (7)$$

This fractional ratio $N_{LOC}$ can be calculated by the frequency compensation module 114 and provided to the location detection subsystem 110 by the frequency compensation module 114 via the compensation parameter 158.

Exemplary Cellular Subsystem that can be Used in the Communication Device

Figure 2:
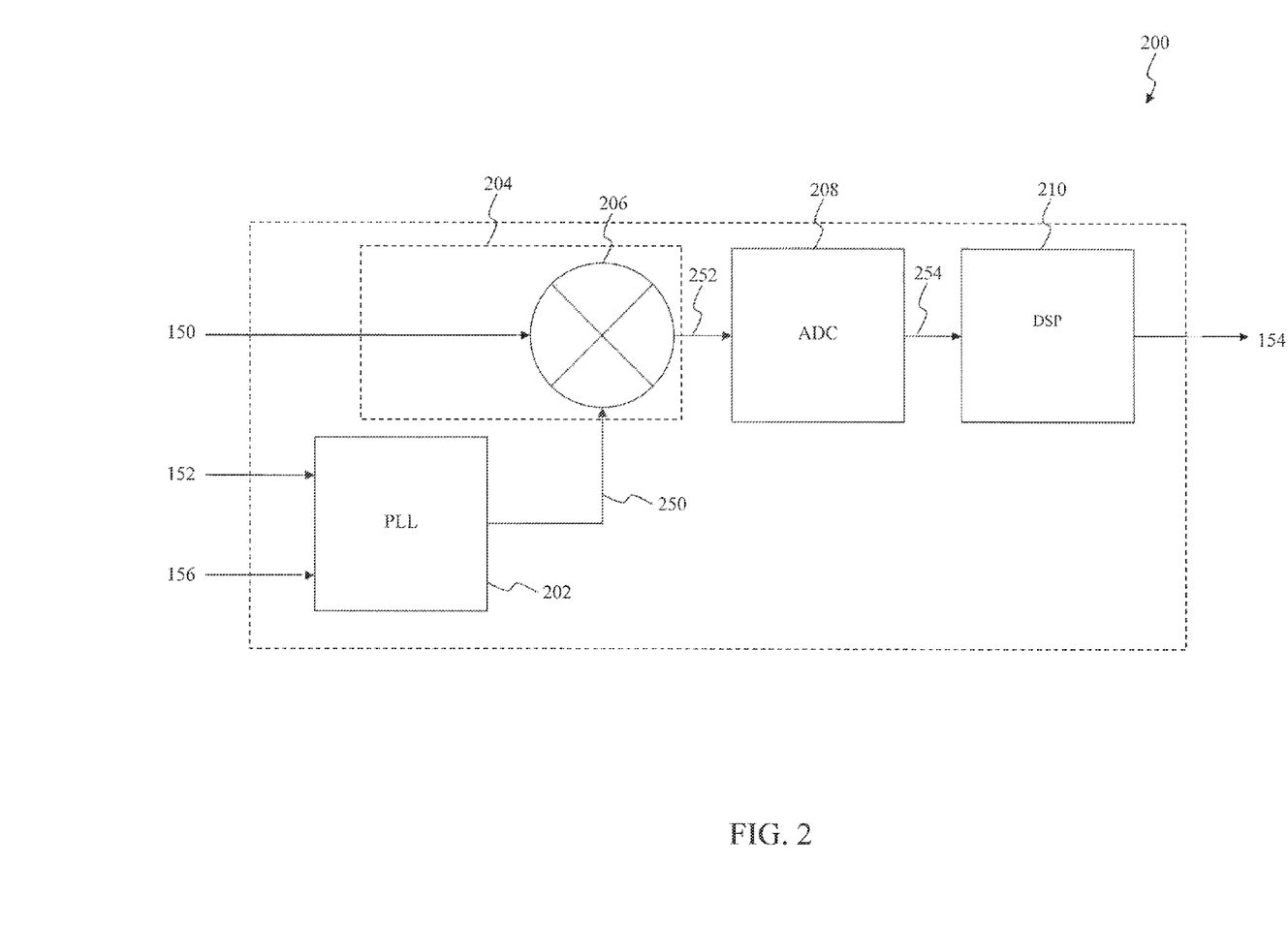
FIG. 2 illustrates an exemplary cellular subsystem that can be used in the communication device in accordance with embodiments of the present disclosure.

FIG. 2 illustrates an exemplary cellular subsystem that can be used in the communication device in accordance with embodiments of the present disclosure. A cellular subsystem 200 receives the cellular communications signal 150 from a cellular base station, such as the cellular base station 106 to provide an example, and processes the cellular communications signal 150 to provide the cellular data stream 154. The cellular subsystem 200 includes phase locked loop (PLL) 202, an analog front end 204, an analog to digital converter (ADC) 208, and a digital signal processor (DSP) 210. The cellular subsystem 200 can represent an exemplary embodiment of the cellular subsystem 108.

The PLL 202 frequency translates the reference signal 152 in accordance with the compensation parameter 156 to provide a local oscillator signal 250. Specifically, the PLL 202 receives the fractional ratio $N_{cell}$ from a frequency compensation module, such as the frequency compensation module 114 to provide an example, via the compensation parameter 156. Typically, the frequency compensation module has a priori adjusted the fractional ratio $N_{cell}$ from its theoretical value to an actual value that accounts for drafting of a frequency of the reference signal 152. The PLL 202 multiplies a frequency of the reference signal 152 by the fractional ratio $N_{cell}$ to provide the local oscillator signal 250.

The analog front end 204 performs various analog signal processing upon the cellular communications signal 150 to provide a baseband cellular communications signal 252. For example, this analog signal processing can include frequency translating the cellular communications signal 150 to baseband, or near baseband. As shown in FIG. 2, the analog front end 204 includes a mixer 206 to frequency translate the cellular communications signal 150 using the local oscillator signal 250 to provide a baseband cellular communications signal 252. Although not illustrated in FIG. 2, those skilled in the relevant art(s) will recognize that the analog signal processing can include any other suitable analog processing, such as filtering or amplifying to provide some examples, without departing from the spirit and scope of the present disclosure.

The ADC 208 converts the baseband cellular communications signal 252 from a representation in the analog domain to a representation in the digital domain to provide a baseband cellular communications sequence 254. The ADC 208 can use a clocking signal derived from the XO 112 which has been adjusted by the XO frequency offset $\hat{\epsilon}$ to compensate for the drifting of the XO 112 or any other clocking signal that will be apparent to those skilled in the relevant art(s) without departing from the spirit and scope of the present disclosure.

The DSP 210 performs various digital signal processing upon the baseband cellular communications sequence 254 to provide the cellular data stream 154. This digital signal processing can include interpolating the baseband cellular communications sequence 254 or any other well known digital processing that will be apparent to those skilled in the relevant art(s) without departing from the spirit and scope of the present disclosure. The DSP 210 can use a clocking signal derived from the XO 112 which has been adjusted by the XO frequency offset $\hat{\epsilon}$ to compensate for the drifting of the XO 112 or any other clocking signal that will be apparent to those skilled in the relevant art(s) without departing from the spirit and scope of the present disclosure.

Figure 3:
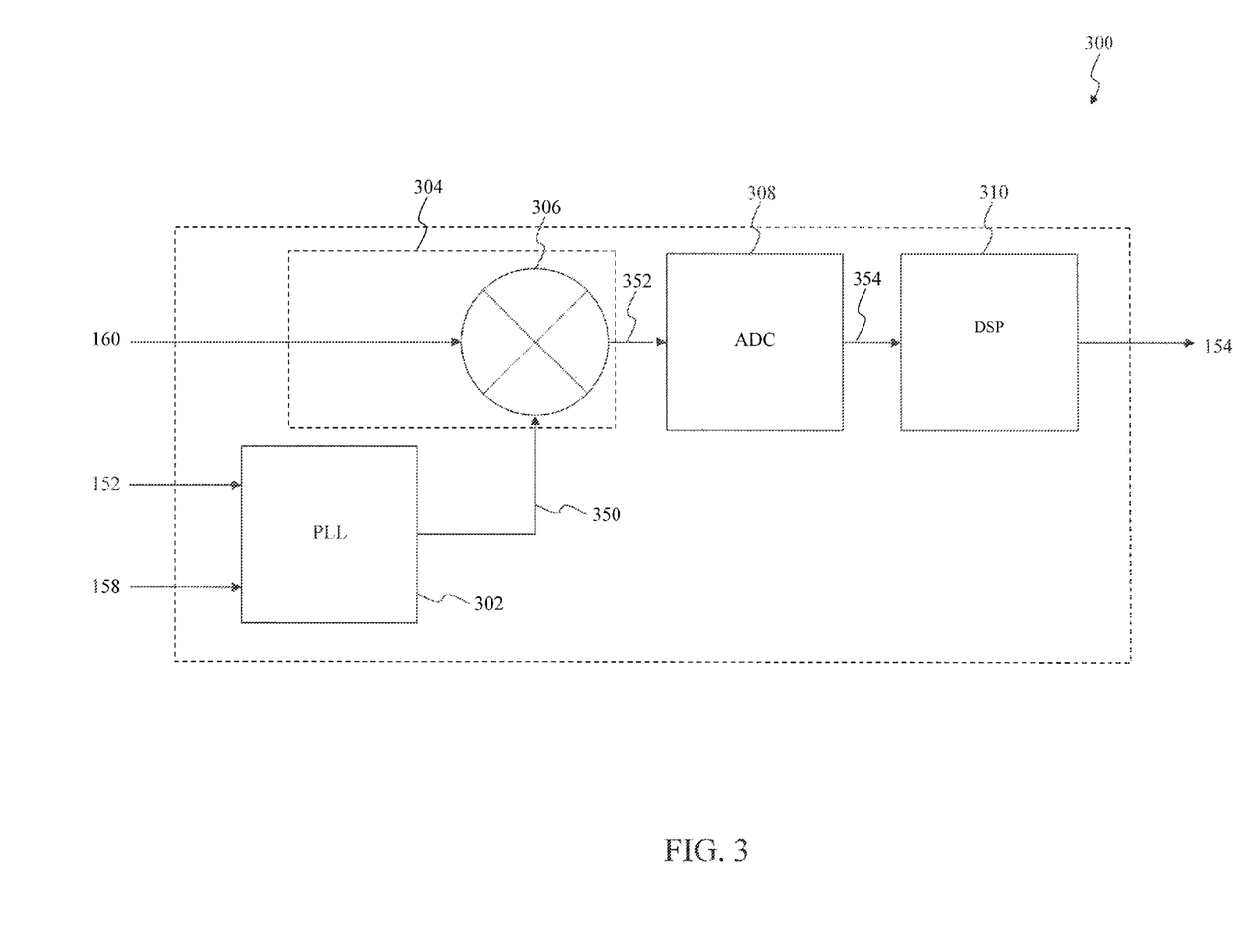
FIG. 3 illustrates an exemplary location detection subsystem that can be used in the communication device in accordance with embodiments of the present disclosure.

Exemplary Location Detection Subsystem that can be Used in the Communication Device FIG. 3 illustrates an exemplary location detection subsystem that can be used in the communication device in accordance with embodiments of the present disclosure. A location detection subsystem 300 receives the satellite communications signal 160 from a satellite, such as the satellite 104 to provide an example, and processes the satellite communications signal 160 to provide the location data stream 162. The location detection subsystem 300 includes a phase locked loop (PLL) 302, an analog front end 304, an analog to digital converter (ADC) 308, and a digital signal processor (DSP) 310. The location detection subsystem 300 can represent an exemplary embodiment of the location detection subsystem 110.

The PLL 302 frequency translates the reference signal 152 in accordance with the compensation parameter 158 to provide a local oscillator signal 350. Specifically, the PLL 302 receives the fractional ratio $N_{LOC}$ from a frequency compensation module, such as the frequency compensation module 114 to provide an example, via the compensation parameter 158. Typically, the frequency compensation module has a priori adjusted the fractional ratio $N_{LOC}$ from its theoretical value to an actual value that accounts for drafting of a frequency of the reference signal 152. The PLL 302 multiplies a frequency of the reference signal 152 by the fractional ratio $N_{LOC}$ to provide the local oscillator signal 350.

The analog front end 304 performs various analog signal processing upon the satellite communications signal 160 to provide a baseband location communications signal 352. For example, this analog signal processing can include frequency translating the satellite communications signal 160 to baseband, or near baseband. As shown in FIG. 2, the analog front end 304 includes a mixer 306 to frequency translate the satellite communications signal 160 using a local oscillator signal 350 to provide a baseband location communications signal 352. Although not illustrated in FIG. 2, those skilled in the relevant art(s) will recognize that the analog signal processing can include any other suitable analog processing, such as filtering or amplifying to provide some examples, without departing from the spirit and scope of the present disclosure.

The ADC 308 converts the baseband location communications signal 352 from a representation in the analog domain to a representation in the digital domain to provide a baseband location communications sequence 354. The ADC 308 can use a clocking signal derived from the XO 112 which has been adjusted by the XO frequency offset $\hat{\epsilon}$ to compensate for the drifting of the XO 112 or any other clocking signal that will be apparent to those skilled in the relevant art(s) without departing from the spirit and scope of the present disclosure.

The DSP 310 performs various digital signal processing upon the baseband location communications sequence 354 to provide the location data stream 162. This digital signal processing can calculate various signals from the baseband location communications sequence 354 to determine location of the device 102, such as Early, Punctual, and Late GPS or GNSS location signals, from the baseband location communications sequence 354 or any other well known digital processing that will be apparent to those skilled in the relevant art(s) without departing from the spirit and scope of the present disclosure. The DSP 310 can use a clocking signal derived from the XO 112 which has been adjusted by the XO frequency offset $\hat{\epsilon}$ to compensate for the drifting of the XO 112 or any other clocking signal that will be apparent to those skilled in the relevant art(s) without departing from the spirit and scope of the present disclosure.

Figure 4:
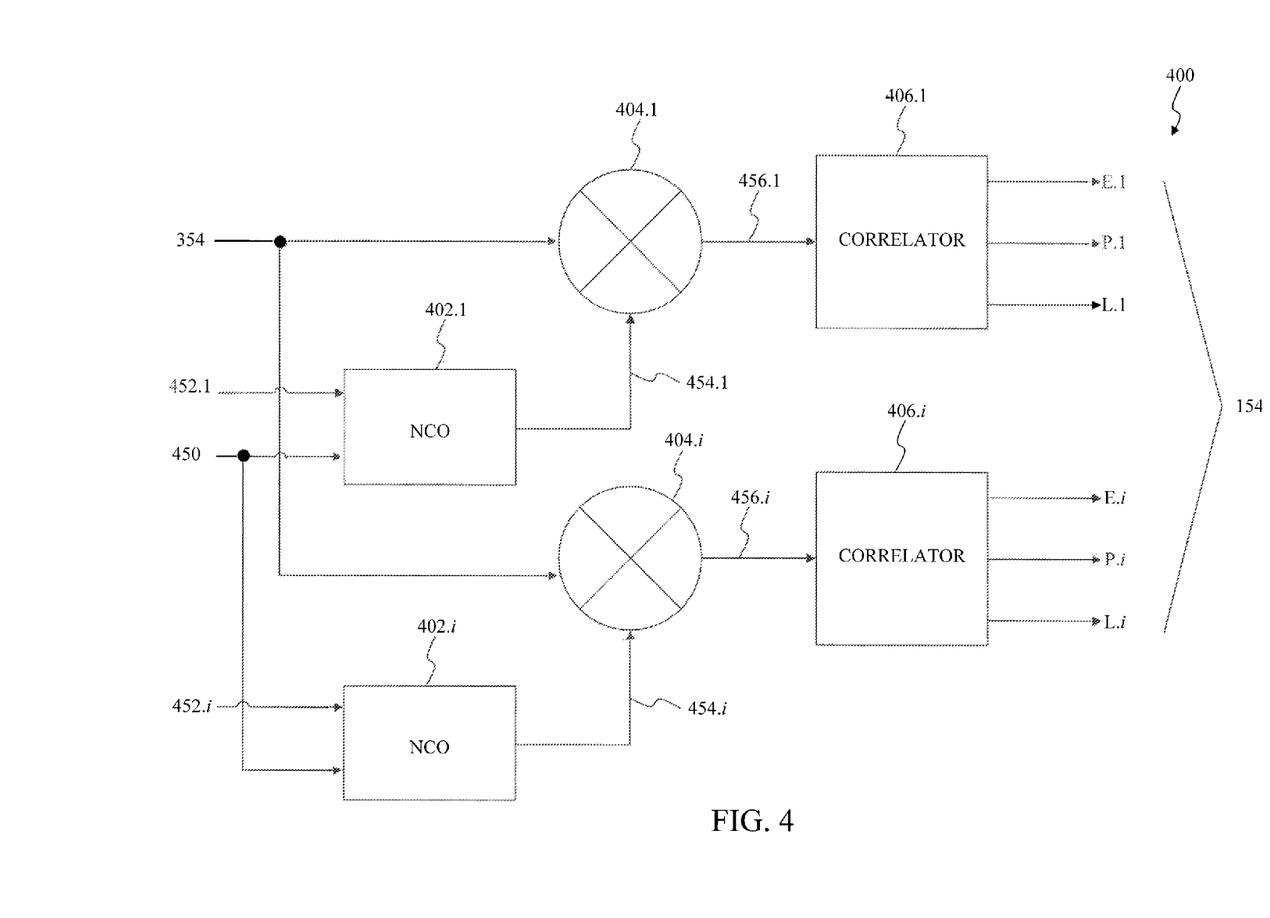
FIG. 4 illustrates an exemplary digital signal processor (DSP) that can be used in the exemplary location detection in accordance w'th embodiments of the present disclosure.

Exemplary Digital Signal Processing Module that can be Used in the Location Detection Subsystem FIG. 4 illustrates an exemplary digital signal processor (DSP) that can be used in the exemplary location detection in accordance with embodiments of the present disclosure. A DSP 400 can calculate various Early, Punctual, and Late GPS location signals from the baseband location communications sequence 354 to determine location of the device 102. The DSP 400 includes numerically controlled oscillators (NCOs) 402.1 through 402.i, multipliers 404.1 through 404.i, and correlators 406.1 through 406.i. The DSP 400 can represent an exemplary embodiment of DSP 310.

The numerically controlled oscillators (NCOs) 402.1 through 402.i provide satellite offset compensation signals 454.1 through 454.i that are used to compensate for different frequency offsets of different satellites. The NCOs 402.1 through 402.i generate the satellite offset compensation signals 454.1 through 454.i using a reference clock 450 that is derived from an oscillator, such as the XO 112. The reference clock 450 can be adjust by the NCOs 402.1 through 402.i using satellite offset compensation parameters 452.1 through 452.i. The satellite offset compensation parameters 452.1 through 452.i represent parameters that are used by the NCOs 402.1 through 402.i to compensate for the different offsets of different satellites as well as the drifting of the XO. Typically, the satellite offset compensation parameters 452.1 through 452.i can be represented by:

$$\xi_k = \frac{\Delta_k}{f_{CLK,NOM}(1 + \hat{\varepsilon})}, \quad (8)$$

where $\xi_k$ represents one of the satellite offset compensation parameter 452.1 through 452.i that corresponds to the $k^{th}$ satellite, $\Delta_k$ represents a frequency offset of the $k^{the}$ satellite, $f_{CLK,NOM}$ represents an expected or a theoretical frequency of the reference clock 450, and $\hat{\varepsilon}$ represents the XO frequency offset $\hat{\varepsilon}$. The XO frequency offset $\hat{\varepsilon}$ can represent an offset of the oscillator that is used to derive the reference clock, such as the XO 112, that results from drifting of the XO, typically caused by aging, and/or changes in temperature, voltage, humidity, pressure, and/or vibration to provide some examples.

The multipliers 404.1 through 404.i frequency translate the baseband location communications sequence 354 using the satellite offset compensation signals 454.1 through 454.i to provide compensated baseband location communications sequences 456.1 through 456.i.

The correlators 406.1 through 406.i correlate the compensated baseband location communications sequences 456.1 through 456.i with a reference code to provide various Early, Punctual, and Late signals that can be used to determine location of the device 102.

3. Methods

Figure 5:
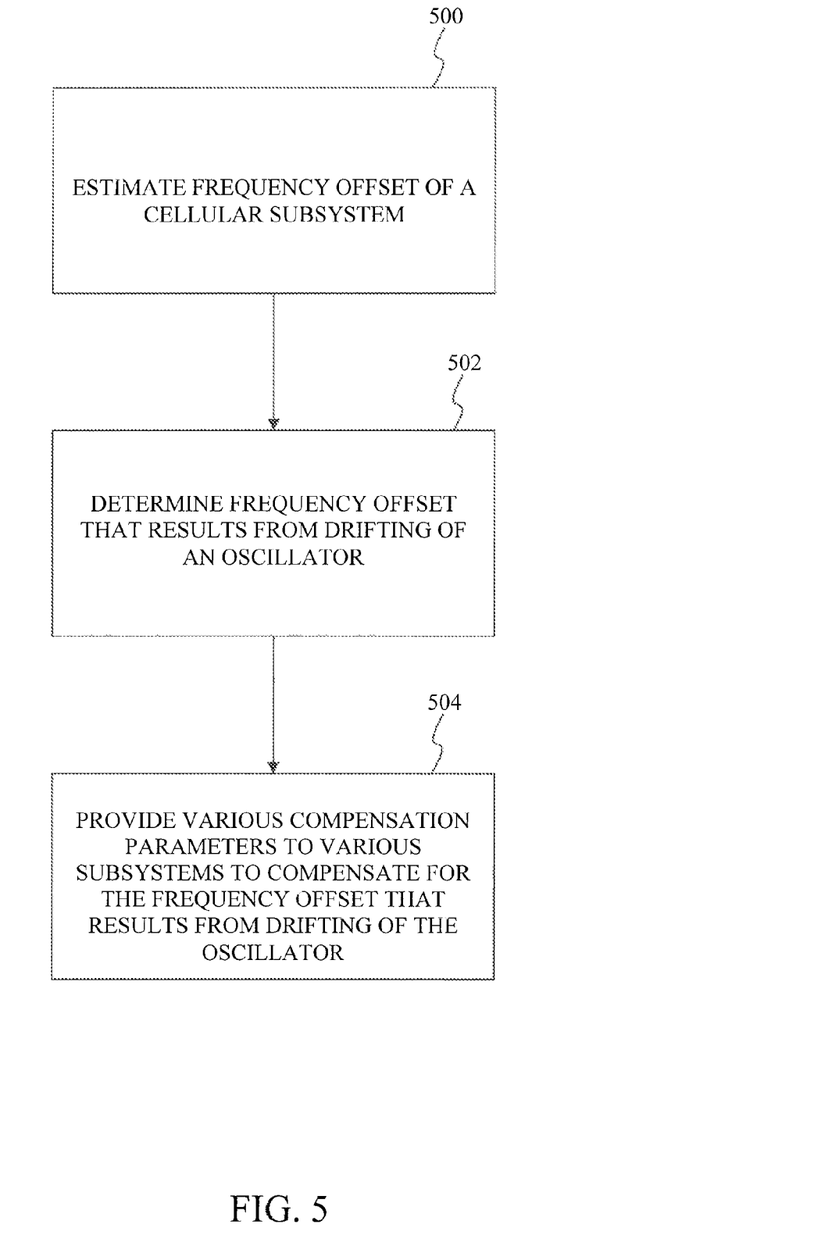
FIG. 5 is a flowchart of exemplary operational steps for compensating for drifting of an oscillator according to an aspect of the present disclosure.

FIG. 5 is a flowchart of exemplary operational steps for compensating for drifting of an oscillator according to an aspect of the present disclosure. The invention is not limited to this operational description. Rather, it will be apparent to persons skilled in the relevant art(s) from the teachings herein that other operational control flows are within the scope and spirit of the present invention. The following discussion describes the steps in FIG. 5.

In step 500, a frequency offset of a cellular subsystem of a device is estimated using equations (1) and (2).

In step 502, a frequency offset that results from drifting of an oscillator, typically caused by aging, and/or changes in temperature, voltage, humidity, pressure, and/or vibration to provide some examples, is determined from the frequency offset of a cellular subsystem using equation (3).

In step 504, various compensation parameters are provided to various subsystems of the device to compensate for the frequency offset that results from drifting of the oscillator. These various compensation parameters can correspond to those parameters determined in equations (4) through (8).

4. Advantages in addition to the cost savings described above, systems and methods according to embodiments of the present disclosure can also result in several other advantages. As previously discussed, the hardware design of systems according to embodiments of the present disclosure can be reduced when compared to dual-XO implementations because additional circuitry is not needed to compensate for additional interference caused by using two or more XOs (i.e., there are fewer clock harmonics to deal with).

Another advantage is an increase the performance of location detection subsystem 110. For example, the time to first fix ("TTFF") performance metric used in GPS and GNSS is improved by augmenting cellular signal information because the GPS/GNSS receiver acquires a position faster relative to previous dual-XO implementations. Tight aiding from cellular subsystem 108 allows location detection subsystem 110 to receive a highly accurate estimate of frequency, which can prevent degradation in sensitivity as stability decreases over the short term. Sensitivity affects how long coherent integrations can be performed, which in turn affects frequency drifts and phase accelerations. By maintaining a tight lock to cellular subsystem 108 in frequency, reference signals can be generated that stay correlated with received signals for longer periods of time, and longer coherent integrations can be performed. Thus, by removing frequency uncertainty from oscillator, sensitivity is improved, which enables a level of sensitivity that has not been previously achieved.

Further, LTE/cellular scanning performance can benefit from using location-tracking provided by location detection subsystem 110 due to a common sense of "time" shared by the cellular 108 and location detection 110 subsystems. LIE positioning pilots (e.g., as described in 3rd Generation Partnership Project ["3GPP"] Release-9) can be used to augment the GPS/GNSS receiver processing and improve performance. By using information from location detection subsystem 110, cellular subsystem 108 can know, in advance, approximate positions of base stations (e.g., base station 106) and can limit searching for base stations to a range around these approximate base station positions. Further, positioning information from base stations can be used to augment the location detection subsystem (e.g., to get a better GPS/GNSS estimate).

Indoor performance is also improved by embodiments of the present disclosure, as the LTE/cellular signal appears to location detection subsystem 110 as an additional satellite. Cellular frequencies are usually relatively high and are generally good at indoor penetration. Thus, by using the high cellular frequencies provided by cellular subsystem 108, location detection subsystem 110 achieves a better indoor performance.

Additionally, if WLAN and/or Bluetooth functionality is also integrated into the device, synergy between cellular subsystem 108 and location detection subsystem 110 can be used to intelligently scan for WLAN and Bluetooth. For example, embodiments of the present disclosure enable the use of a WLAN modem (which has a stable source) and use cellular information to provide aiding information to location detection subsystem 110 such that short term variations at 10-100 ms are compensated by frequency tracking loops available in the modem.

5. Conclusion

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present invention.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An apparatus, comprising:
an oscillator configured to provide a reference signal that is characterized as having a reference frequency that is subject to a variation in frequency over time;
a first subsystem coupled to the oscillator, wherein the first subsystem comprises a first phase locked loop, (PLL), and wherein the first subsystem is configured to process a first communication signal using the reference signal;
a second subsystem coupled to the oscillator, wherein the second subsystem comprises a second PLL, and wherein the second subsystem is configured to process a second communication signal using the reference signal; and
a frequency compensation module configured to:
estimate a first frequency offset present in the first communication signal,
determine a second frequency offset based on the first frequency offset,
provide a first compensation parameter that is derived from the second frequency offset to the first PLL, and
provide a second compensation parameter that is derived from the second frequency offset to the second PLL.

2. The apparatus of claim 1, wherein the first subsystem is a cellular subsystem and the second subsystem is a location detection subsystem, wherein the first communication signal is a cellular communication signal that is received from a base station, and wherein the second communication signal is a satellite communication signal that is received from a satellite.

3. The apparatus of claim 1, wherein the oscillator is characterized as being a free-running oscillator, and wherein the reference frequency does not include circuitry to adjust the frequency.

4. The apparatus of claim 1, wherein the oscillator is a digitally compensated crystal oscillator.

5. The apparatus of claim 1, wherein the oscillator is characterized as being a free-running oscillator, and wherein the reference frequency is subject to change due to at least one of aging, changes in temperature, voltage, humidity, pressure, or vibration within the oscillator.

6. The apparatus of claim 1, wherein the frequency compensation module is further configured to estimate the first frequency offset based upon a phase difference between a first symbol from the first communication signal and a second symbol from the first communication signal.

7. The apparatus of claim 6, wherein the frequency compensation module is further configured to determine a ratio of the phase difference and a duration in time between the first and second symbols to estimate the first frequency offset.

8. The apparatus of claim 1, wherein the frequency compensation module is further configured to determine a ratio of the first frequency offset to an operational frequency of the first subsystem to determine the second frequency offset.

9. The apparatus of claim 1, wherein the first compensation parameter and the second compensation parameter represent a first fractional ratio of the first PLL and a second fractional ratio of the second PLL, respectively, and wherein the first fractional ratio is determined by the equation:

$$\frac{f_{first}}{f_O(1+\hat{\varepsilon})},$$

where $f_{first}$ represents an operational frequency of the first subsystem, $f_o$ represents a theoretical frequency value of the reference frequency, and $\hat{\varepsilon}$ represents the second frequency offset.

10. The apparatus of claim 9, wherein the second fractional ratio is determined by the equation:

$$\frac{f_{second}}{f_0(1+\hat{\varepsilon})}$$

where $f_{second}$ represents an operational frequency of the second subsystem, $f_o$ represents a theoretical frequency value of the reference frequency, and $\hat{\varepsilon}$ represents the second frequency offset.

11. The apparatus of claim 10, wherein $f_{second}$ represents an operational frequency of a satellite communicatively coupled to the second subsystem.

12. The apparatus of claim 1, wherein the first subsystem is further configured to frequency translate the reference signal by the first compensation parameter.

13. An apparatus, comprising:
an oscillator configured to provide a reference signal that is characterized as having a reference frequency that is subject to a variation in infrequency over time;
a first subsystem coupled to the oscillator, wherein the first subsystem comprises a first phase locked loop (PLL), and wherein the first subsystem is configured to process a first communication signal using the reference signal;
a second subsystem coupled to the oscillator, wherein the second subsystem comprises a second PLL, and wherein the second subsystem is configured to process a second communication signal using the reference signal; and
a frequency compensation module configured to:
estimate a first frequency offset present in the first communication signal,
determine a second frequency offset based on the first frequency offset,
provide a first compensation parameter that is derived from the second frequency offset to the first PLL, and
provide a second compensation parameter that is derived from the second frequency offset to the second PLL, wherein the first compensation parameter and the second compensation parameter represent a first fractional ratio of the first PLL and a second fractional ratio of the second PLL, respectively.

14. A system on an integrated circuit (IC), the system comprising:
a sole crystal oscillator:
a cellular subsystem coupled to the sole crystal oscillator, wherein the cellular subsystem comprises a first phase locked loop (PLL), and wherein the cellular subsystem is configured to receive a communication signal; and
a location detection subsystem coupled to the sole crystal oscillator, wherein the location detection subsystem comprises a second PLL, and wherein the cellular subsystem and the location detection subsystem are configured to share the sole crystal oscillator; and a frequency compensation module configured to:
estimate a frequency offset present in the communication signal,
provide a first compensation parameter that is derived from the frequency offset to the first PLL, and
provide a second compensation parameter that is derived from the frequency offset to the second PLL.

15. The system of claim 14, wherein the cellular subsystem is in communication with a base station, and wherein the location detection subsystem is in communication with a satellite.

16. The system of claim 14, wherein the sole crystal oscillator is used as a basis for providing a first reference frequency for the cellular subsystem and a second reference frequency for the location detection subsystem.

17. The system of claim 16, wherein the frequency offset is determined based upon a phase difference between symbols of cellular data produced by the cellular subsystem.

18. The system of claim 14, wherein the cellular subsystem is further configured to frequency translate a reference signal generated by the sole crystal oscillator by the first compensation parameter.

19. The system of claim 14, wherein the first compensation parameter and the second compensation parameter represent a first fractional ratio of the first PLL and a second fractional ratio of the second PLL, respectively.

20. A method, comprising:
estimating a first frequency offset present in a first communication signal received by a cellular subsystem of a device;
determining, using the first frequency offset, a second frequency offset that results from drifting of a reference frequency of a reference signal that is used to process the first communication signal, wherein the reference signal is generated by an oscillator shared by the cellular subsystem and a location detection subsystem;
providing a first compensation parameter that is derived from the second frequency offset to a first phase locked loop (PLL) of the cellular subsystem, and
providing a second compensation parameter that is derived from the second frequency offset to a second PLL of the location detection subsystem.

21. The method of claim 20, wherein the reference frequency drifts as a result in aging or changes in temperature, voltage, humidity, pressure, or vibration within the oscillator.

22. The method of claim 20, wherein the step of estimating the first frequency offset comprises:
estimating the first frequency offset based upon a phase difference between a first symbol from the first communication signal and a second symbol from the first communication signal.

23. The method of claim 22, wherein the step of estimating the first frequency offset based upon the phase difference comprises:
determining a ratio of the phase difference and a duration in time between the first and second symbols to estimate the first frequency offset.

* * * * *

UNITED STATES PATENT AND TRADEMARK OFFICE
CERTIFICATE OF CORRECTION

| | | |
|---|---|---|
| PATENT NO. | : 8,934,853 B2 | Page 1 of 1 |
| APPLICATION NO. | : 13/492311 | |
| DATED | : January 13, 2015 | |
| INVENTOR(S) | : Lorenz et al. | |

It is certified that error appears in the above-identified patent and that said Letters Patent is hereby corrected as shown below:

In the Claims

Column 12, line 7, please replace "loop," with --loop--.

Column 13, line 47, please replace "oscillator:" with --oscillator;--.

Signed and Sealed this
Twenty-eighth Day of April, 2015

Michelle K. Lee
*Director of the United States Patent and Trademark Office*